(12) United States Patent
Hansl et al.

(10) Patent No.: US 12,415,677 B2
(45) Date of Patent: Sep. 16, 2025

(54) STORAGE SYSTEM

(71) Applicant: L.O.A. Srl, Formigine Modena (IT)

(72) Inventors: Rudolf Hansl, Linz (AT); Maurizio Davolio, Vignola Modena (IT)

(73) Assignee: L.O.A. Srl, Formigine Modena (IT)

( * ) Notice: Subject to any disclaimer, the term of this patent is extended or adjusted under 35 U.S.C. 154(b) by 558 days.

(21) Appl. No.: 17/782,494

(22) PCT Filed: Nov. 26, 2020

(86) PCT No.: PCT/EP2020/084470
§ 371 (c)(1),
(2) Date: Jun. 3, 2022

(87) PCT Pub. No.: WO2021/110836
PCT Pub. Date: Jun. 10, 2021

(65) Prior Publication Data
US 2023/0002158 A1 Jan. 5, 2023

(30) Foreign Application Priority Data
Dec. 4, 2019 (DE) ...................... 10 2019 133 074.2

(51) Int. Cl.
*B65G 1/04* (2006.01)
*B65G 1/02* (2006.01)
*B65G 1/06* (2006.01)

(52) U.S. Cl.
CPC ........... *B65G 1/0492* (2013.01); *B65G 1/026* (2013.01); *B65G 1/065* (2013.01)

(58) Field of Classification Search
CPC ....... B65G 1/0492; B65G 1/026; B65G 1/065
See application file for complete search history.

(56) References Cited

U.S. PATENT DOCUMENTS 8,061,503 B2 * 11/2011 Ancarani ........... B65G 47/2445
198/398
8,868,232 B2 * 10/2014 Freudelsperger ...... B65G 47/68
198/395

(Continued)

FOREIGN PATENT DOCUMENTS

DE 3442111 A1 7/1986
DE 29922536 U1 5/2001

(Continued)

Primary Examiner — Saul Rodriguez
Assistant Examiner — Ashley K Romano
(74) Attorney, Agent, or Firm — Loginov & Associates, PLLC; William A. Loginov

(57) ABSTRACT

The invention relates to a storage system, which comprises at least one station (2), such as a station for receiving goods, for re-shelving goods, picking goods and/or supplying goods from the store, and a high-bay warehouse (3) having a plurality of storage places (31) arranged adjacent to and on top of each other for the storage of goods, wherein the storage system (1) comprises at least one displaceable goods transport vehicle (4) which is designed to transport at least one item from the station (2) to any storage place (31) or vice versa, without reloading the goods onto a different goods transport vehicle (4) or another means of transport. The invention is characterized in that the goods transport vehicle (4) is designed to move in the horizontally oriented area between the station (2) and the high-bay warehouse (3) for transporting the goods as well as horizontally and vertically in the high-bay warehouse (3).

15 Claims, 4 Drawing Sheets

(56) References Cited

U.S. PATENT DOCUMENTS

| | | | | |
|---|---|---|---|---|
| 9,409,728 B2* | 8/2016 | Bastian | ................. | B65G 47/69 |
| 9,598,239 B2* | 3/2017 | Lert, Jr. | ............... | B65G 1/1373 |
| 10,494,179 B1 | 12/2019 | Alspaugh | | |
| 10,961,060 B1* | 3/2021 | Zhao | ................... | B65G 47/268 |

FOREIGN PATENT DOCUMENTS

| | | |
|---|---|---|
| DE | 102011012424 A1 | 8/2012 |
| DE | 102017112305 A1 | 7/2018 |
| EP | 3154877 A1 | 4/2017 |
| JP | S6053705 U | 4/1985 |
| JP | S63208412 A | 8/1988 |
| JP | H0642810 U | 6/1994 |
| WO | 2007037397 A1 | 4/2007 |
| WO | 2012083437 A1 | 6/2012 |
| WO | 2016172253 A1 | 10/2016 |
| WO | 2016196815 A1 | 12/2016 |
| WO | 2018157093 A1 | 8/2018 |
| WO | 2018189110 A1 | 10/2018 |

* cited by examiner

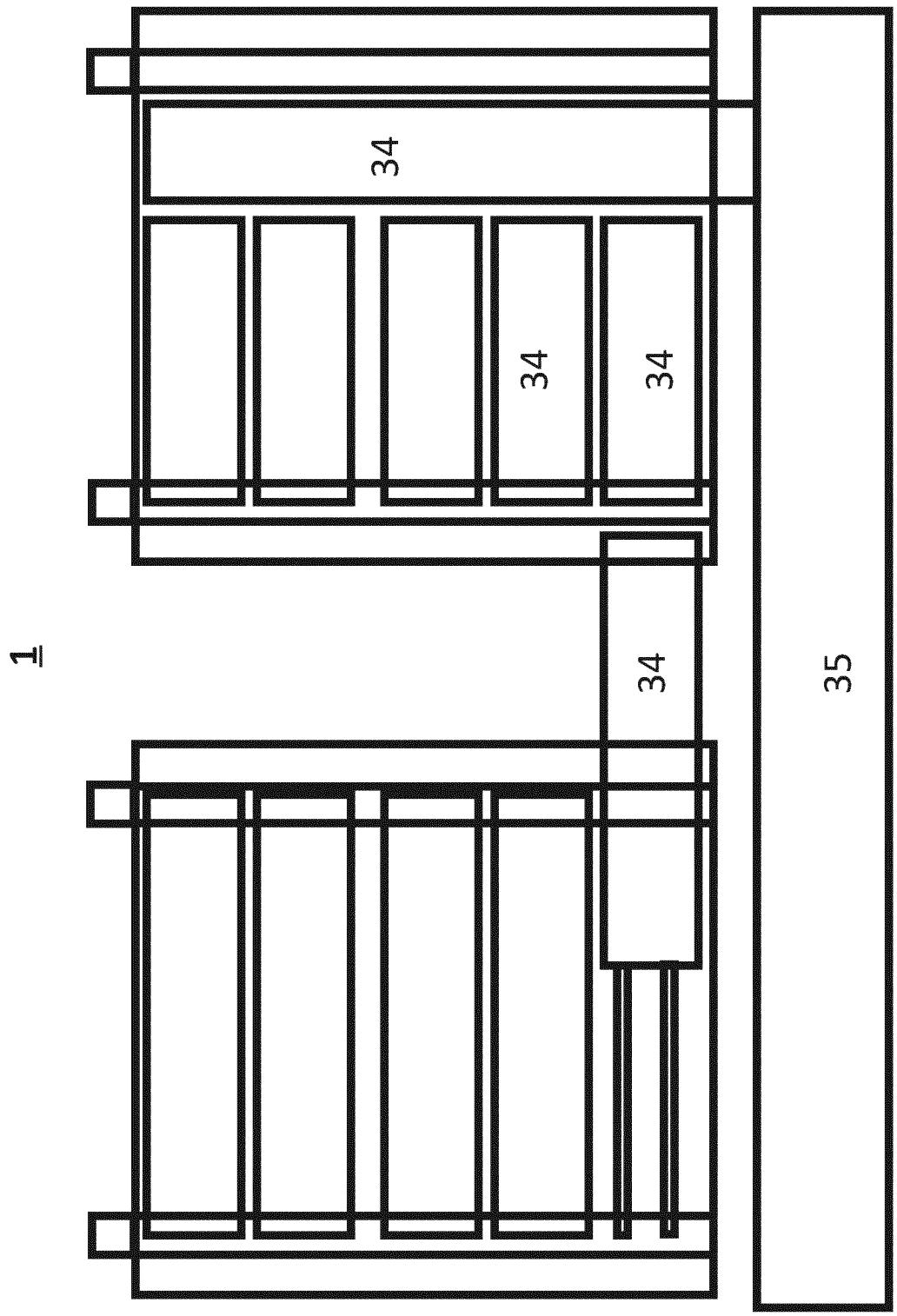

STORAGE SYSTEM

The invention relates to a storage system which comprises at least one station, such as a goods storage, goods transfer, goods picking and/or goods retrieval station, and a high-bay warehouse. The high-bay warehouse has a multiplicity of storage spaces arranged beside one another and above one another for the storage of goods, wherein the storage system also comprises at least one movable goods transport vehicle, which is set up to transport at least one item of goods from the station to any desired storage space or vice versa without transferring the goods to another goods transport vehicle or another transport device. The invention further relates to a goods transport vehicle for a corresponding storage system.

Storage systems of the generic type are commonly set up with their goods transport vehicles to enable the most efficient possible material flow between a high-bay warehouse and possibly also a multiplicity of stations such as goods storage, goods transfer, goods picking and/or goods retrieval stations.

The stations themselves can be set up as workstations for individuals and/or robots, at which at least one individual and/or at least one robot handles goods which have been removed from the high-bay warehouse or which are to be stored in the high-bay warehouse.

The problem with the storage systems and goods transfer vehicles known from the prior art is that these are not optimized to configure the working sequences at the stations, that is to say the operations carried out by the persons and/or robots, such as the picking of individual shipping packages, as efficiently as possible.

Against this background, it is an object of the invention to provide an improved storage system and an improved goods transport vehicle by means of which the transport of the goods can be optimized and, in particular, the working sequences at the station can be configured more efficiently.

According to the invention, this object is achieved by a storage system as claimed in claim 1 and by a goods transport vehicle as claimed in claim 14. Advantageous refinements are the subject matter of the sub-claims.

The invention provides a storage system which comprises at least one station, such as a goods storage, goods transfer, goods picking and/or goods retrieval station and a high-bay warehouse. The high-bay warehouse has a multiplicity of storage spaces arranged beside one another and above one another for the storage of goods, wherein the storage system also comprises at least one movable goods transport vehicle which is set up to transport at least one item of goods from the station to any desired storage space or vice versa without transferring the goods to another goods transport vehicle or another transport device.

The invention further provides for the goods transport vehicle to be set up for the transport of the goods to move both in the horizontally oriented area between the station and the high-bay warehouse and also horizontally and vertically in the high-bay warehouse. The goods transport vehicle and the travel path assigned to the goods transport vehicle are formed in such a way that the most flexible goods transport between the high-bay warehouse and the station and, moreover, also between individual storage spaces of the high-bay warehouse is achieved. In particular, it is thus possible that more than one goods transport vehicle can be positioned in the region of the station to pick up and/or set down goods. The goods transport vehicles and the station can be set up in such a way that two or more goods transport vehicles can possibly also be positioned simultaneously at the station to pick up and/or set down goods. The goods transport vehicle can also be set up to carry out all transport activities automatically or autonomously. It can therefore be a robot vehicle with appropriate open-loop/closed-loop control, sensors and a drive device.

In the present case, picking up goods means that an item of goods or several goods are removed from a storage space, for example, or from the station by the goods transport vehicle in order to be able to be transported by the goods transport vehicle. In a corresponding way, setting down goods, conversely means that an item of goods or several goods are set down by the goods transport vehicle at the station or at a storage space. Here, picking up and setting down the goods can be carried out or assisted by the goods transport vehicle itself or by other aids; picking up and setting down goods can also be designated as conveying the goods which are or can be provided on the goods transport vehicle in and out.

In a preferred embodiment, it is conceivable that at least some of the storage spaces of the high-bay warehouse comprise vertical beams and horizontal beams, wherein the horizontal beams each comprise at least one horizontal travel area, in which the goods transport vehicle can be moved horizontally, and the vertical beams each comprise at least one vertical travel area, in which the goods transport vehicle can be moved vertically. The travel areas are those areas along which the goods transport vehicle can be moved and with which the goods transport vehicle is in contact. The travel areas can accordingly be an integral constituent part of the storage spaces, at least in some areas, which simplifies the production and the construction of the system. Of course, the travel area of the goods transport vehicle can comprise further areas in addition to the beams of the storage spaces, such as in particular sections between the high-bay warehouse and the station. These sections can be simple, in particular level, floor areas, on which the goods transport vehicle can be moved and on which the high-bay warehouse and/or the station is positioned. Alternatively or additionally, the travel area of the goods transport vehicle can comprise more complex structures such as, for example, rails and/or connecting rack gears, over which the goods transport vehicle can be moved between the high-bay warehouse and the station. The goods transport vehicle is set up to carry out all movements automatically, that is to say without any external electromechanical drives or other components. The goods transport vehicle can also be moved in the area of the storage system independently of further goods transport vehicles that may be present, wherein it is of course set up to prevent collisions with these other goods transport vehicles. The high-bay warehouse can be constructed such that the goods transport vehicle can move to different rows of the high-bay warehouse without in between having to move on the base of the high-bay warehouse.

In a particularly preferred embodiment, it is conceivable that the horizontal travel areas between two adjacent storage spaces are separated by a vertical travel area and/or that the vertical travel areas comprise a rack gear, a chain and/or a perforated plate. Such design configurations offer a particularly simple and cost-effective possibility of utilizing a goods transport vehicle which is able to travel autonomously to different levels of a high-bay warehouse.

In a further particularly preferred embodiment, it is conceivable that direction change areas are provided between horizontal travel areas and vertical travel areas, permitting a direction change of the movement of the goods transport vehicle between a horizontal and a vertical direction. The direction change areas can, for example, comprise cutouts in the horizontal travel areas and/or the vertical travel areas.

In a further preferred embodiment, it is conceivable that the goods transport vehicle is set up mechanically to be movable either only horizontally or only vertically at a given time. This provides a safeguard which prevents erroneous travel of the goods transport vehicle and therefore increases the availability of the goods transport vehicle and of the storage system overall.

In a particularly preferred embodiment, it is conceivable that the vertical travel areas are arranged to be offset from the horizontal travel areas, so that the vertical travel areas are also arranged further than the horizontal travel areas from a travel space of the goods transport vehicle, in which the goods transport vehicle is located when traveling. The aforementioned offset arrangement of the vertical travel areas and the horizontal travel areas can be understood to mean that the vertical travel areas are positioned more deeply within the structure of the high-bay warehouse than the horizontal travel areas. Also conceivable is an embodiment in which both travel areas are arranged to be equally deep in relation to the high-bay warehouse or in which the horizontal travel areas are positioned more deeply within the structure of the high-bay warehouse than the vertical travel areas.

In a further preferred embodiment, it is conceivable that the high-bay warehouse comprises at least two high-bay rows arranged parallel to and spaced apart from each other and each having at least one horizontal travel area, wherein the goods transport vehicle can be moved horizontally in the horizontal travel areas, and/or the horizontal travel area has a C-shaped and/or an L-shaped profile. Embodiments of this type further simplify the constructional configuration of the storage system with its goods transport vehicle. This in particular further simplifies the flexible transport of goods by means of the goods transport vehicle. This proposal makes it possible to move the goods transport vehicles horizontally above one another and thus to avoid a possible jam in the aisle between the two high-bay warehouses.

In a further preferred embodiment, it is conceivable that the goods transport vehicle can be moved automatically and/or that the goods transport vehicle can be moved automatically over at least one vertical travel area from a horizontal travel area to another horizontal travel area spaced apart vertically therefrom, and/or that, to convey the goods that are or can be provided on the goods transport vehicle in or out, the goods transport vehicle comprises a conveying device, such as a transport belt that can be driven by a drive or a roller track that can be driven by a drive. The conveying device can, additionally or alternatively, be a gripping device or another device which is set up to move goods between the goods transport vehicle and a storage space at a distance from the latter.

In a further preferred embodiment, it is conceivable that the station comprises a transport belt and/or a roller track, wherein the transport belt and/or the roller track are set up to transport at least one item of goods from the goods transport vehicle to a workspace on the transport belt and/or on the roller track. In the present case, the transport belt or the roller track is conceived explicitly as a constituent part of the station.

The transport belt or the roller track makes it possible to keep and to transport the goods in a specific order. If the goods are, for example, to be picked by an individual or a robot, then the goods can be provided exactly in the order in which, for example, they are to be added to an individual package shipment. The transport belt or the roller track also makes it possible for the goods to be provided to the individual or the robot with the smallest possible physical spacings or time intervals. The individual or the robot thus does not have to wait time-consumingly for a following provision of a following item of goods by a following goods transport vehicle, as is known from the prior art. According to the prior art, this is because goods are provided directly from a goods transport vehicle, which means without any interposed transport belt or any interposed roller track, to a robot or to an individual for further handling of the goods. If, then, a subsequent item of goods likewise has to be provided to the robot or the individual, then first of all the currently used goods transport vehicle must free up space around the robot or the individual in order that the following goods transport vehicle with the following item of goods can approach the robot or the individual.

In a further preferred embodiment, it is conceivable that the station comprises at least one picking rack, which is set up to be driven on by the goods transport vehicle both horizontally and vertically. The picking rack facilitates flexible placing of the goods on the transport belt or on the roller track. Of course, the picking rack can be dimensioned in such a way that more than one single goods transport vehicle can be moved thereto simultaneously. This makes it simpler to position goods on the transport belt or on the roller track in a desired order.

In a further preferred embodiment, it is conceivable that the picking rack comprises vertical beams and horizontal beams like the storage spaces of the high-bay warehouse. The beams of the picking rack can be formed identically in terms of construction to the beams of the high-bay warehouse, so that it is made possible for the goods transport vehicle to be able to move both in the high-bay warehouse and also in the picking rack. In particular, it is conceivable that the beams of the picking rack and of the high-bay warehouse have the same cross sections.

In a further preferred embodiment, it is conceivable that the picking rack is formed with multiple stories and/or that at least one picking rack is respectively arranged on both longitudinal sides of the transport belt and/or the roller track, and/or that the goods transport vehicle is set up to move to the picking rack automatically, and/or that the picking rack is set up directly on or in the high-bay warehouse, as a part of the high-bay warehouse or at a distance from the latter.

Depending on the practical configuration of the picking rack, it is thus conceivable, in the case of a separate picking rack which is spaced apart from the high-bay warehouse, to provide travel loops or other connecting devices between the picking rack and the high-bay warehouse, which permit aisles to be changed, so that the goods transport vehicle can move from all high-bay aisles to all picking areas or spaces of the station or the picking rack. In the present case, travel paths for the goods transport vehicle can be viewed as high-bay aisles, which are arranged between individual racks of the high-bay warehouse.

In an embodiment of the invention having two picking racks arranged along the transport belt or the roller track, it is more simply possible that a plurality of goods transport vehicles can discharge packages or goods onto the transport belt or onto the roller track, if appropriate also from both longitudinal sides of the transport belt or the roller track, in particular simultaneously or at short time intervals. In this way, the formation of a desired goods sequence or sequence of packages is simplified, which in turn means that the efficiency of the individual handling the goods or of the robot handling the goods is increased.

Therefore, provision is advantageously made for the storage system to have a sequencing device, which is set up to discharge the goods stored in the picking rack, on the goods transport vehicle moving in the picking rack and/or in the storage spaces of the picking rack onto the transport belt or roller track in an order that is predefined or predefinable (e.g. by a storage or packaging control program.

In an alternative refinement of the proposal, provision is made for the picking rack to be set up as part of the high-bay warehouse. Such a configuration saves space.

In a further preferred embodiment, it is conceivable that the picking rack is designed to be lower and/or shorter than the high-bay warehouse. The size of the picking rack can in particular be matched to the size of the station and/or to how many goods transport vehicles are intended to have access to the transport belt or to the roller track simultaneously or within a short time. The picking rack can be integrated within a high bay, wherein, for example, the transport belt or the roller track of the station is at least partly positioned between two rows of the high bay, and the sections of the high-bay warehouse that are adjacent to the transport belt or the roller track are formed as a picking rack or function as one.

The picking rack can alternatively or additionally be arranged above the transport belt or above the roller track, wherein the goods transport vehicles can be designed to be able to set down goods onto the transport belt or onto the roller track from above.

Furthermore, the proposal advantageously provides that the storage space be formed as an actively or passively driven belt conveyor. Alternatively, provision is made for the storage space to be equipped with a goods pushing or goods pulling device. The possibility that the goods can be moved in the storage space opens up a multiplicity of possibilities. Firstly, it is possible that the storage space can be filled more efficiently with goods, that is to say for example, smaller items of goods can be stored more efficiently on one storage space. However, provision is also made for the storage space also to perform a transport task for the goods, wherein, preferably, the respective storage space adjoins the front or rear side of an aisle in which, for example, the goods can be accepted by the goods transport vehicle or where the goods can be stored. In the case of wider high-bay warehouses, it is of course possible that the adjacent storage spaces are each equipped with corresponding adjacent storage spaces and corresponding conveying devices and also thus permit autonomous movement of the goods by the goods transport vehicle.

Of course, it is possible that a combined device is used, which is used both as a goods pushing and as a goods pulling device, depending on the direction of movement of the actuator. Alternatively, provision is also made that the goods transport vehicle, if appropriate each goods transport vehicle of the storage system, is equipped with an appropriate goods pushing and/goods pulling device.

An actively driven belt conveyor is preferably equipped with its own electric motor monitored and controlled by the control of the storage system.

In a passively driven belt conveyor, the conveyor power or conveyor energy is derived from another element of the storage system. For example, the goods transport vehicle is equipped with an appropriate drive, which can be coupled to the storage space and thus supplies the passive belt conveyor with drive energy. This can be done, for example, by means of an appropriate power take-off or the like.

In a preferred refinement of the invention, provision is made for the storage space to have a telescopic storage space section and for the goods stored on the storage space to be movable by the telescopic storage space section, in particular conveyed into or out of the aisle between the individual high-bay racks. The movement of the goods on the storage space can also be implemented by this device. The proposal also permits the goods to be conveyed over the aisle from one high-bay rack into the next adjacent high-bay rack without keeping a goods transport vehicle or another bridge element in the aisle (temporarily) for this purpose. In this case, an autonomous drive for the storage space, for example with an electric motor and a corresponding mechanical drive and guide for the telescopic storage space section, is conveniently provided.

Furthermore, provision is made that the storage space itself moves the at least one item of goods during the storage, in particular transversely to the longitudinal extent of the high-bay warehouse. Hitherto, it has been usual for the high-bay warehouse to accommodate the goods to be stored statically and for the goods to be stored and also retrieved again either by the storage and retrieval unit or the goods transport vehicle, in particular when the goods are to be picked and dispatched. For optimization purposes, provision has already been made for the goods in the rack storage system to be stored in an optimized manner, that is to say goods that are used and needed often for example are stored so as to be quick to reach, and goods which are turned over more seldom are better stored in the more remote areas of the high-bay warehouse. Appropriate algorithms have also been known for a long time for the flexible assignment of the storage spaces to the size and quantity of the goods to be stored. For fully automatic storage and retrieval of the goods, it is advantageous if the storage spaces are equipped with appropriate conveying devices that can be driven (actively or passively), such as belt conveyors, a telescopic storage space section or the like, that is to say the storage spaces are upgraded with a corresponding conveying device.

However, this conveying device now permits an additional surprising advantage, since the static store now becomes a dynamic store, in which the storage space moves the goods in a manner predefined in accordance with an algorithm. An advantageous refinement therefore provides that the storage space of the storage system, in particular the high-bay warehouse, has a buffer store composed of a plurality of storage spaces, in which the goods to be stored are at least moved through the storage spaces, pre-grouped or pre-picked. The storage system can be used considerably more flexibly as a result of this proposal, since this buffer store or buffer belt (composed of a plurality of individual, each drivable storage spaces), as an individual station or pre-station for the goods picking, assists the latter considerably and permits more efficient processing. At this point, it should be pointed out that the above-described ideas can also be implemented independently of the configuration of the storage system described at the beginning, that is to say this buffer store or buffer belt arranged in the high-bay warehouse can also be implemented if the goods are repeatedly transferred between the storage space and the station on further conveying devices, such as, for example, a storage and retrieval unit or further goods transport vehicles.

The invention further relates to a goods transport vehicle for a storage system as described at the beginning. The goods transport vehicle can be designed to implement some or all of the further features and functions mentioned above in conjunction with the storage system.

In a preferred embodiment, it is conceivable that the goods transport vehicle is set up to transport individual goods between a storage space of a high-bay warehouse and a transport belt and/or a roller track of a station. Accordingly, the goods transport vehicle can not only pick up and transport containers having a multiplicity of goods or packages but a number of goods needed exactly, for example for a picking job, that is to say can also transport individual goods. This results in a series of advantages. For example, the goods transport vehicle, after carrying out a goods transport, can carry out a following goods transport directly and does not firstly have to transport excess goods back to their storage space in the high-bay warehouse. It is also made simpler to transport different goods jointly by means of the goods transport vehicle. This is because it is only the goods that are just needed, for example for a current picking job, and no further goods that are transported, which permits more transport capacity in the goods transport vehicle for other goods, in particular needed subsequently. The goods needed subsequently can be assigned, for example, to the current picking job or a subsequent picking job.

Further details and advantages of the invention are described by using the figures, in which:

FIG. 4 shows a schematic top view of a storage space of the storage system.

Figure 1:
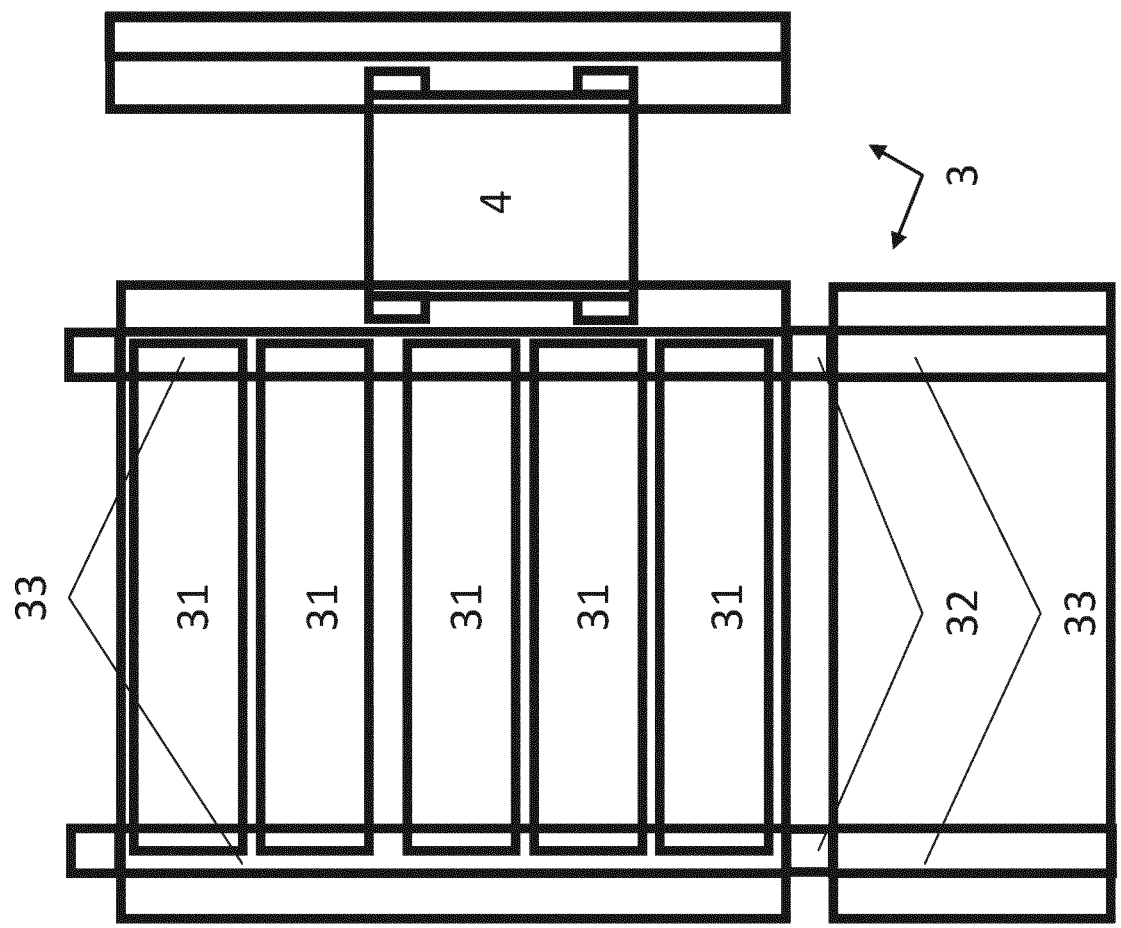
FIG. 1 shows a schematic top view of part of the storage system.

FIG. 1 shows part of a storage system 1 for storing goods or packages. The storage system 1 is shown in a top view. The storage system 1 comprises at least one station 2, which is explained in more detail in the following FIGS. 2 and 3. The station 2 can be a goods storage, goods transfer, goods picking and/or a goods retrieval station. The storage system 1 further comprises a high-bay warehouse 3 having a multiplicity of storage spaces 31 arranged beside one another and/or above one another for the storage of goods. The high-bay warehouse 3 can comprise a multiplicity of rows of racks, which in particular can be arranged parallel to one another.

The storage system 1 further comprises at least one movable goods transport vehicle 4, which is set up to transport at least one item of goods from the station 2 to any desired storage space 31 or vice versa without transferring the goods to another goods transport vehicle 4 or another transport device. The goods transport vehicle 4 is set up to move both in the horizontally orientated area between the station 2 and the high-bay warehouse 3 and also horizontally and vertically in the high-bay warehouse 3 for the transport of the goods. In the top view of FIG. 1, the goods transport vehicle 4 can move between two rows of racks of the high-bay warehouse 3 in a horizontal plane or in a vertical direction in the figure.

At least some of the storage spaces 31 of the high-bay warehouse 3 can comprise vertical beams 32 and horizontal beams 33, wherein the horizontal beams 33 each comprise at least one horizontal travel area, in which the goods transport vehicle 4 can be moved horizontally, and the vertical beams 32 each comprise at least one vertical travel area, in which the goods transport vehicle 4 can be moved vertically. The travel areas of the beams 32, 33 can be made in one piece with the beams. In the exemplary embodiment of FIG. 1, five storage spaces 31, to which two horizontal beams 33 are assigned, are shown in the upper area. The number of storage spaces 31 which is assigned to the horizontal beams 33 and the vertical beams 32 can, however, be higher or lower than is shown in FIG. 1.

The vertical beams 32 can be formed as supports of the high-bay warehouse 3, which extend upward from a base of the high-bay warehouse 3 and on which the horizontal beams 33 are arranged.

In the left-hand area of FIG. 1, it can be seen that the horizontal beams 33 of two adjacent storage spaces 31 can be separated by a vertical beam 32. Thus, the two horizontal beams 33 of the upper five storage spaces 31 are each separated from the lower two horizontal beams 33 by a vertical beam 32. The two vertical beams 32 identified by the designation 32 space apart the horizontal beams 33 adjacent to them. The horizontal beams 33 can be screwed and/or welded and/or coupled in another way to the vertical beams 32 adjacent to them.

The vertical beams 32 can comprise at least one rack gear, a chain and/or a perforated plate, which can be designed such that the goods transport vehicle 4 can move thereon in the vertical direction along the high-bay warehouse 3. Between the horizontal travel areas of the horizontal beams 33 and the vertical travel areas of the vertical beams 32, it is possible for further direction change areas to be provided, which permit a direction change of the movement of the goods transport vehicle 4 between a horizontal and a vertical direction. The direction change areas can be cutouts on the beams 32, 33 or on each one of the beams 32, 33. The direction change areas can comprise guide and/or supporting sections which permit a direction change of the goods transport vehicle.

The storage system 1 comprises, in particular in the area of the high-bay warehouse 3, travel areas for the goods transport vehicle 4, in which the latter can move either in the horizontal direction or in the vertical direction. In order to prevent malfunctions from occurring during the travel of the goods transport vehicle, provision can be made for the goods transport vehicle 4 to be set up mechanically so as to be movable either only horizontally or only vertically at a given time.

Provision can further be made for the vertical travel areas to be arranged to be offset from the horizontal travel areas, so that the vertical travel areas are arranged further than the horizontal travel areas from a travel space of the goods transport vehicle 4 in which the goods transport therefore 4 is located when traveling. Since the vertical travel areas can be assigned to the vertical beams 32 and the horizontal travel areas can be assigned to the horizontal beams 33, the beams 32, 33 themselves can be arranged to be correspondingly offset from one another.

On the right in FIG. 1, part of one row of the high-bay warehouse 3 is shown, said row being arranged parallel to the row of the high-bay warehouse 3 shown on the left in FIG. 1. Each of the two high-bay rows comprises at least one horizontal travel area, wherein the goods transport vehicle 4 can be moved horizontally in the two horizontal travel areas. The two horizontal travel areas of the two high-bay rows are correspondingly arranged parallel to each other and spaced apart in such a way that the goods transport vehicle 4 rests with its left-hand side on the left-hand horizontal travel area and with its right-hand side on the right-hand horizontal travel area. The horizontal transfer area can have a C-shaped and/or an L-shaped profile, which is part of the horizontal beam 33 and on the horizontally aligned leg of which the goods transport vehicle 4 travels.

The goods transport vehicle 4 can be capable of moving automatically, that is to say can be a robot vehicle. For this purpose, it can comprise all the required devices such as a drive, a closed-loop/open-loop control system, a power supply, sensor devices, communications interfaces and the like.

The storage system 1 can be constructed in such a way that the goods transport vehicle 4 can be moved automatically over at least one vertical travel area from a horizontal travel area to another horizontal travel area spaced apart vertically therefrom. This vertical travel direction of the goods transport vehicle 4 corresponds to the direction perpendicular to the drawing plane of FIG. 1. In particular, it is conceivable that the goods transport vehicle 4 can be moved over a total of four vertical travel areas or vertical beams 32 in a vertical direction. To this end, the goods transport vehicle 4 can, for example, be dimensioned to be sufficiently large that it can simultaneously be coupled to a total of four vertical beams 32 and moved along the latter in the vertical direction.

To convey the goods that are or can be provided on the goods transport vehicle 4 in or out, the goods transport vehicle 4 can comprise a conveying device, such as a transport belt that can be driven by a drive or a roller track that can be driven by a drive.

Figure 2:
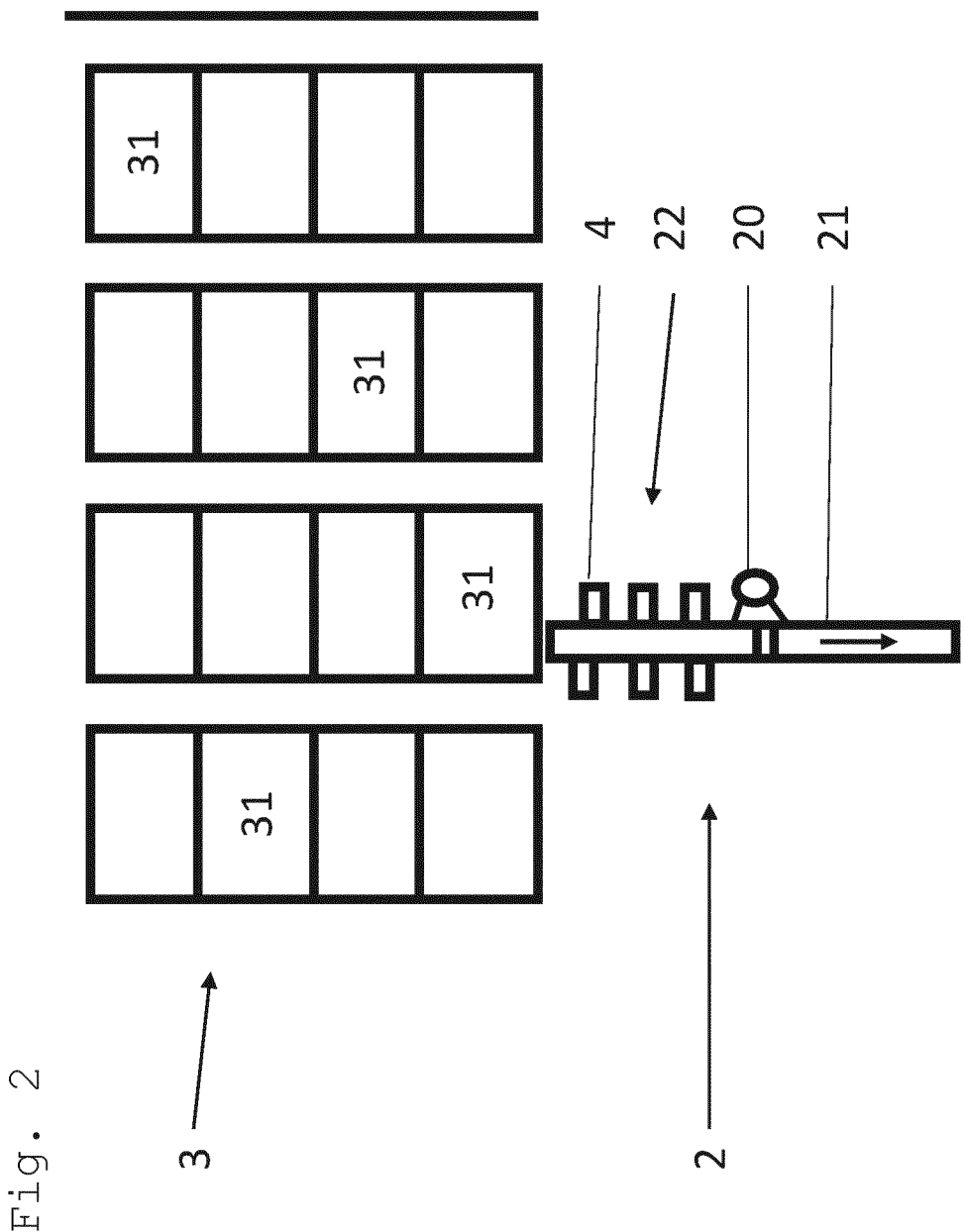
FIG. 2 shows a schematic top view of the storage system with a picking station together with picking rack.

FIG. 2 shows the storage system 1 in a top view, wherein the high-bay warehouse 3 can be seen in the upper area and a station 2 can be seen in the lower area of FIG. 2. The station 2 can be, for example, a picking station in which an individual 20 loads goods from a transport belt 21 into a shipping container such as a shipping carton.

Alternatively or additionally, the station 2 can comprise a roller track. The transport belt 21 and/or the roller track can be set up to transport at least one item of goods from the goods transport vehicle 4 to a workspace on the transport belt 21 and/or on the roller track.

The station 2 can also comprise at least one picking rack 22, which is set up to be approached both horizontally and vertically by the goods transport vehicle 4. The beams of the picking rack 22 can be formed identically to the beams of the high-bay warehouse 3, so that the goods transport vehicle 4 can approach the picking rack 22 and the high-bay warehouse 3 in the same way.

Figure 3:
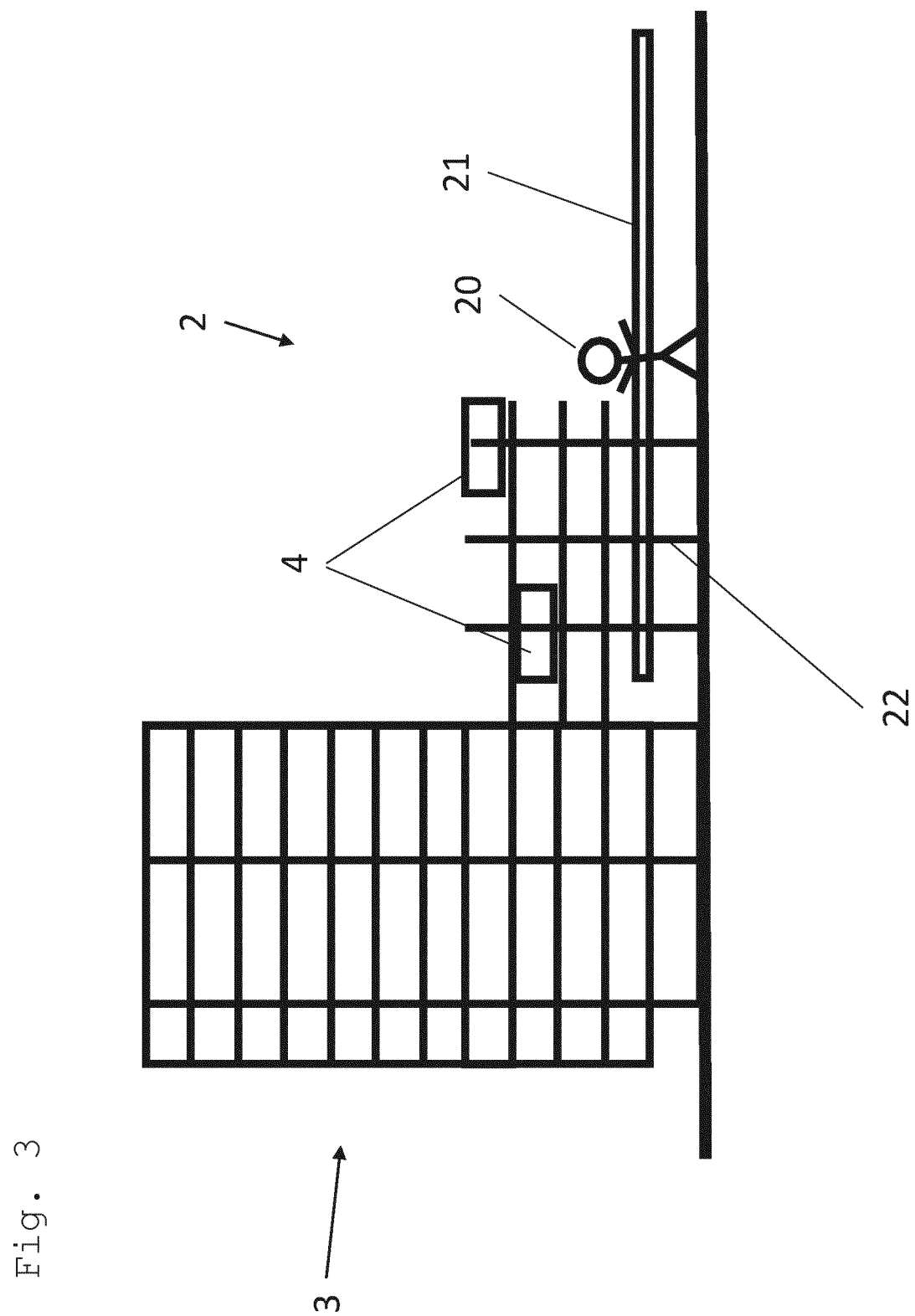
FIG. 3 shows a schematic side view of the storage system with a picking station together with picking rack.

As can be gathered from FIG. 3, the picking rack 22 can be formed with multiple stories. In the exemplary embodiment, up to five stories of the picking rack 22 can be seen. Of course, a number of stories differing from this can also be provided. FIG. 3 also shows that two goods transport vehicles 4 are located simultaneously and above each other in the picking rack 22. The goods transport vehicles 4 can approach the picking rack 22 in order to set down goods on the transport belt 21 or to pick up goods from the transport belt 21. Depending on the size of the picking rack 22, a correspondingly high or low number of goods transport vehicles 4 can be movable simultaneously in the picking rack 22.

A picking rack 22 can be provided on each longitudinal side of the transport belt 21. In this way, goods transport vehicles 4 can approach from both longitudinal sides of the transport belt 21 and/or the roller track to transfer goods to the latter. The terms transport belt 21 and roller track are to be understood widely in the present case and can comprise all devices by means of which goods can be brought to the individual 20 by the goods transport vehicles 4.

In particular, provision can be made for the goods transport vehicles 4 to be set up to approach the picking rack 22 automatically. The picking rack 22 can be approached by the goods transport vehicles in the same way as the high-bay warehouse 3. FIG. 3 shows that the picking rack 22 can be arranged directly on the high-bay warehouse 3. Here, the height of the individual stories of the picking rack 22 can correspond to the height of the storage spaces 31 or the stories of the high-bay warehouse 3. Alternatively, it is conceivable that the picking rack 22 is set up at a distance from the high-bay warehouse 3. Here, an appropriate connecting device between the picking rack 22 and the high-bay warehouse 3 can be provided. FIG. 3 additionally shows that the picking rack 22 can be designed to be lower and/or shorter than the high-bay warehouse 3.

The invention described at present thus offers a previously unknown possible way for an extremely wide range of goods to be stored, removed, picked and prepared for shipping in a highly automated store.

The goods transport vehicle 4 can be a simple, lightweight and cost-effective vehicle, which comprises a very lightweight frame with wheels. The vehicle can also comprise a transport belt, by means of which goods can be picked up or set down by the vehicle. The vehicle can further comprise a simple mechanism for driving goods transport devices, wherein the goods transport devices can be provided at the storage spaces 31 and/or at the stations 2 and can be set up to transport goods between the storage spaces 31 and/or the station 2, on the one hand, and the goods transport vehicle 4, on the other hand. The vehicle can also comprise a drive device, which can be inserted into the beams of the high-bay warehouse 3 or the picking rack 22 to drive the vehicle. The goods transport vehicle 4 can further comprise a simple mechanism for changing the direction of travel of the goods transport vehicle 4. A power supply of the goods transport vehicle 4 can be provided, for example, via in particular metallic travel areas of the goods transport vehicle 4. Here, a low-voltage busbar or a corresponding system can be used. Alternatively or additionally, the goods transport vehicle 4 can comprise a battery.

The goods transport vehicle 4 can be controlled by means of central control software or decentralized closed-loop/open-loop control with appropriate closed-loop/open-loop software can be provided on the goods transport vehicle 4. The control software can in any case be set up to calculate or travel over an optimal route through the high-bay warehouse 3 or to the station 2 for a given transport job. The control software or the closed-loop/open-loop control can also be set up to detect other goods transport vehicles 4 in order to avoid collisions and blockages.

The goods transport vehicle 4 can further comprise a WLAN device and/or Bluetooth device in order, for example, to communicate with a central server and/or with other goods transport vehicles 4 and/or with service devices. The goods transport vehicle 4 can, moreover, have a device for collision prevention and/or fenders, by means of which damage to the goods transport vehicle 4 can be prevented or minimized.

The goods transport vehicle 4 can be set up to move forward and rearward with a speed of about 10 m/s. The wheels of the goods transport vehicle 4 can have a diameter of 50-300 mm. The operating voltage or power supply of the goods transport vehicle 4 can have a voltage of 24-48 V.

The goods transport vehicle 4 can further comprise steering rollers and/or be movable along rails, so that independent steering of the goods transport vehicle 4 is made possible. The goods transport vehicle 4 can comprise a drive for driving along an X direction and two drives for driving along a Y direction. It is also possible to provide a transport belt, which is set up to transport goods in a Z direction.

The components of the storage system 1, such as, for example, the beams 32, 33, can be made of steel, aluminum and/or plastic. These can be profiled elements. Such profiled elements can be mounted, adapted and interchanged very easily. The beams 32, 33 and travel areas of the goods transport vehicle 4 can be angled relative to the horizontal and thus form ramps, on which the goods transport vehicle 4 can overcome differences in height.

In the case of angled travel areas, these structures can comprise, for example, transverse strips or other devices which prevent the goods transport vehicle 4 from slipping when travelling on the ramp. Here, it is conceivable that the ramp has a surface which has a high frictional resistance. It is also conceivable that teeth or projections or cutouts are provided on the ramp, which permit travel even on steep ramps without the goods transport vehicle 4 slipping. The goods transport vehicle 4 can comprise appropriate mating structures which can interact with the structures of the ramp.

The goods transport vehicle 4 can be moved along a rail system, in particular outside the high-bay warehouse 3. The rail system can comprise two substantially parallel-guided rails for guiding the goods transport vehicle 4 or a single-space-saving rail. An embodiment with a single rail also permits the goods transport vehicle 4 to be guided along smaller curve radii. The vertical beams 32 and horizontal beams 33 of the high-bay warehouse 3 can be part of the rail system.

The rail system can be built up from individual modules which comprise a barcode and/or an RFID transponder. This makes it possible to program the goods transport vehicle particularly quickly for the autonomous travel on the rail system. The installation and subsequent modifications or expansions of the storage system are simplified and accelerated in this way.

The modules of the rail system can comprise WLAN or Bluetooth devices, by means of which the installation, the commissioning and the expansion of the system can be simplified and, during the operation of the system, errors, faults and damage to the system can be detected.

The vertical beams 32 can comprise apertures, with which the transport vehicle 4 can interact for the vertical travel of the goods transport vehicle 4. This also applies to the area of the picking rack 22 and therefore the station 2.

Each goods transport vehicle 4 can comprise a simple IPC (industrial PC) as a closed-loop/open-loop control system, which can be arranged on the goods transport vehicle 4 and can be connected to a main server via WLAN. The main server here can be assigned to the storage system. The goods transport vehicle 4 can be controlled by means of the IPC and, for example, be moved in accordance with an order or in accordance with a picking job. The IPC can make access to in particular external software, or have an appropriate interface to external systems and, over the latter, obtain information as to how the goods transport vehicle 4 is to be moved in the high-bay warehouse 3 or in the context of the storage system 1. The IPC can also manage the exact dimensions of the goods and, if necessary, exchange information in this regard with the main server.

FIG. 4 shows a schematic top view of a storage space 31 of the storage system 1. The storage space 31 and its properties, described below, are representative here of any desired number of corresponding or similar storage spaces 31 of the storage system 1. The storage space 31 can comprise movable sections, which are set up to accommodate, that is to say to store and/or at least partly to move, goods stored in or on the storage space 31.

It is conceivable, for example, that the storage space 31 is formed as a belt conveyor 34 or comprises a belt conveyor 34. The belt conveyor 34 can be arranged transversely with respect to the longitudinal direction of the row of racks in which the storage space 31 is located. In this way, goods stored on the belt conveyor 34 can be moved from an inner area of the storage space 31 to an outer area of the storage space 31 and vice versa. In an embodiment in which the storage space 31 is bounded on two sides by store aisles or high-bay aisles or in which store aisles are arranged on two sides of the storage space 31, an item of goods can be moved from one of the store aisles to the other store aisle by means of the belt conveyor 34 without a goods transport vehicle 4 being needed for this purpose.

It is also conceivable that differently oriented belt conveyors 34 are provided in the high-bay warehouse 3. For this purpose, these belt conveyors 34 can be set up to accept goods from or to transfer goods to one another or to transport goods. Thus, provision can be made for at least one belt conveyor 34 to be arranged parallel to the longitudinal direction of a row of racks, while a plurality of belt conveyors 34 is arranged transversely thereto. In this way, goods can be moved at least partly independently of goods transport vehicles 4 in the high-bay warehouse or between individual storage spaces 31 of the high-bay warehouse. A storage space 31 here can correspond substantially to a belt conveyor 34 arranged transversely to the longitudinal direction of the row of racks.

The term belt conveyor 34 is not used in a restrictive way in the present case. Thus, all devices by means of which goods can be arranged movably within the storage space 31 are suitable. The belt conveyor 34 can comprise an individual drive and/or an individual power supply of the drive. It is also conceivable that the belt conveyor 34 can be couplable to the goods transport vehicle 4 to drive the belt conveyor 34. The belt conveyor 34 can be designed to pick up goods from a goods transport vehicle 4 or to transfer goods to a goods transport vehicle 4.

Provision can further be made for at least one conveying element 35 to be provided at the end of a high-bay aisle, by means of which goods can be transported or interchanged over several aisles without a goods transport vehicle 4 being required for this purpose. The conveying element 35 can be set up to accept goods from a goods transport vehicle 4 and to transfer goods to the goods transport vehicle 4.

The lower of the two belt conveyors 34 identified by the designation 34 in FIG. 4 is shown in a telescoped-out or otherwise adjusted state, in which the corresponding storage space 31 has automatically been brought close to a neighboring storage space 31 of another row of racks. A belt conveyor 34 is not necessarily required for this purpose. Thus, the embodiment of a storage space 31 is also conceivable which, although it does not comprise a belt conveyor 34, is arranged so that it can nevertheless be extended telescopically or otherwise moved relative to the rack on which it is located. By means of appropriately movable storage spaces 31, it can advantageously be made possible to move goods over aisles or high-bay aisles from one storage space 31 to a neighboring storage space 31 without a goods transport vehicle 4 being needed for this purpose.

LIST OF DESIGNATIONS

1 Storage system
2 Station
3 High-bay warehouse
4 Goods transport vehicle
21 Transport belt
22 Picking rack
31 Storage spaces
32 Vertical beam 33 Horizontal beam
34 Belt conveyor
35 Conveying element

The invention claimed is:

1. A storage system, comprising at least one station comprising at least one of a goods storage, goods transfer, goods picking and/or goods retrieval station, and a high-bay warehouse, having a multiplicity of storage spaces arranged beside one another and above one another for storage of goods, wherein the storage system comprises:
   at least one movable goods transport vehicle which is arranged to transport at least one item of goods from the station to any desired storage space, or vice versa, without transferring the goods to another goods transport vehicle or another transport device,
   wherein the goods transport vehicle can be moved automatically,
   wherein at least some of the storage spaces of the high-bay warehouse comprise vertical beams and horizontal beams, wherein the horizontal beams each comprise at least one horizontal travel area, in which the goods transport vehicle can be moved horizontally, and the vertical beams each comprise at least one vertical travel area, in which the goods transport vehicle can be moved vertically,
   wherein direction change areas are provided between horizontal travel areas and vertical travel areas, which permit a direction change of the movement of the goods transport vehicle between a horizontal and a vertical direction,
   wherein the station comprises at least one picking rack, which is arranged to be driven on both horizontally and vertically by the goods transport vehicle,
   wherein the picking rack comprises vertical beams and horizontal beams like the storage spaces of the high-bay warehouse,
   wherein the goods transport vehicle is arranged to move to the picking rack automatically,
   wherein the commissioning rack is arranged directly on or in the high-bay warehouse, as part of the high bay warehouse, or at a distance from the commissioning rack, and
   wherein the goods transport vehicle is arranged for transport of the goods both in the horizontally oriented area between the station and the high-bay warehouse and also to move horizontally and vertically in the high-bay warehouse and/or the picking rack.

2. The storage system as claimed in claim 1, wherein the goods transport vehicle is arranged mechanically to be movable either only horizontally or only vertically at a given time and/or the station comprises a transport belt and/or a roller track, wherein the transport belt and/or the roller track are/is arranged to transport at least one item of goods from the goods transport vehicle to a workspace on the transport belt and/or on the roller track.

3. The storage system as claimed in claim 2, wherein the horizontal travel areas of two adjacent ones of the storage spaces are separated by a vertical travel area, and/or wherein the vertical travel areas comprise a rack gear, a chain and/or a perforated plate.

4. The storage system at least as claimed in claim 2, wherein the vertical travel areas are arranged to be offset from the horizontal travel areas, so that the vertical travel areas are arranged further than the horizontal travel areas from a travel space of the goods transport vehicle in which the goods transport vehicle is located when traveling, and/or the high-bay warehouse comprises at least two high-bay rows arranged parallel to and spaced apart from each other and each having a horizontal travel area, wherein the goods transport vehicle can be moved horizontally in the horizontal travel areas, and/or wherein the horizontal travel area has a C-shaped and/or an L-shaped profile, and/or wherein, to convey the goods that are or can be provided on the goods transport vehicle in or out, the goods transport vehicle comprises a conveying device, such as a transport belt that can be driven by a drive or a roller track that can be driven by a drive.

5. A goods transport vehicle for a storage system as claimed in claim 4.

6. The storage system at least as claimed in claim 2, wherein the picking rack is formed with multiple stories, and/or wherein at least one picking rack is respectively arranged on both longitudinal sides of the transport belt and/or the roller track.

7. A goods transport vehicle for a storage system as claimed in claim 6.

8. The storage system as claimed in claim 2, wherein the storage system has a sequencing device, which is arranged to discharge the goods stored in the picking rack, on the goods transport vehicle moving in the picking rack and/or in the storage spaces of the picking rack onto the transport belt or roller track in an order that is predefined or predefinable, and/or the picking rack is designed to be lower and/or shorter than the high-bay warehouse.

9. A goods transport vehicle for a storage system as claimed in claim 2.

10. The storage system as claimed in claim 1, wherein the storage space
   is formed as an actively or passively drivable belt conveyor, or the storage space is equipped with a goods pushing or goods pulling device, and/or the storage space has a telescopic storage space section, and the goods stored on the storage space are movable by the telescopic storage space section.

11. The storage system as claimed in claim 10, wherein the goods stored on the storage space can be conveyed into or out of the aisle between the individual high bay racks.

12. The storage system as claimed in claim 1, wherein the storage space
   itself moves the at least one item of goods during the storage, and/or the storage space of the storage system has a buffer store composed of a plurality of storage spaces, in which the goods to be stored are at least moved through the storage spaces, pre-grouped or pre-picked.

13. The storage system as claimed in claim 12, wherein the storage space itself moves the at least one item of goods transversely to a longitudinal extent of the high-bay warehouse.

14. The storage system as set forth in claim 12, wherein the high-bay warehouse has the buffer store composed of the plurality of storage spaces.

15. A goods transport vehicle for a storage system as claimed in claim 1.

\* \* \* \* \*